United States Patent [19]

Mathis

[11] 4,077,011

[45] Feb. 28, 1978

[54] UNCERTAIN INTERVAL TIMER USING A VARIABLE LENGTH SHIFT REGISTER

[75] Inventor: Joseph Richard Mathis, Wappingers Falls, N.Y.

[73] Assignee: International Business Machines Corporation, Armonk, N.Y.

[21] Appl. No.: 752,335

[22] Filed: Dec. 20, 1976

[51] Int. Cl.² .............................................. G04F 10/04
[52] U.S. Cl. ..................................... 328/129; 328/37; 324/181; 364/900
[58] Field of Search .................. 328/37, 75, 130, 129; 324/73 R, 181; 364/900 MS

[56] References Cited

U.S. PATENT DOCUMENTS

| | | | |
|---|---|---|---|
| 3,745,475 | 7/1973 | Turner | 328/129 X |
| 3,824,480 | 7/1974 | Eshraghian | 328/37 X |
| 3,851,154 | 11/1974 | Beecham | 328/37 X |
| 3,863,224 | 1/1975 | Alexander | 328/37 X |

*Primary Examiner*—John S. Heyman
*Attorney, Agent, or Firm*—Robert J. Haase

[57] ABSTRACT

A composite shift register timer for controlling a sequence of events occurring over a demand-response interface. The composite shift register comprises a primary shift register and a secondary shift register. The primary shift register is divided into successive portions which are selectively coupled together in successive pairs upon timely receipt of respective response signals. A first binary "1" is inserted into the first portion at the start of a predetermined sequence of events. The first "1" is clocked through to the end of the first portion where it initiates a demand and is stored pending the receipt of a corresponding response. A second binary "1" is clocked through the secondary shift register beginning with the initiation of each demand. The clocking of the second "1" continues until the receipt of a timely response to the initiated demand whereupon the secondary shift register is reset. The timely response also is applied to the coupling means between the first and second portions of the primary shift register to permit the stored first "1" to propagate into and be clocked through the second portion. If no timely response is received, the second "1" propagates to the end of the secondary shift register to produce an "error" signal. The error signal deactivates each coupling means between the portions of the first shift register to prevent the first binary "1" from propagating any farther, thus terminating the sequence of events.

8 Claims, 4 Drawing Figures

PRIOR ART  FIG. 1

UNCERTAIN INTERVAL TIMER USING A VARIABLE LENGTH SHIFT REGISTER

BACKGROUND OF THE INVENTION

The present invention generally relates to response interval monitors and, more particularly, to devices for monitoring the occurrences of delayed responses and for discriminating against responses which are delayed in excess of a maximum allowable time.

When designing a logic network to control a sequence of events, a shift register can be used. At the start of the sequence, the register is initialized to all "0's" with the first stage being set to a "1". The register is clocked at a uniform rate and the position of the "1" bit within the register at any given time is used to initiate the particular event within the sequence of events which is desired to occur at the given time. The shift register technique provides many advantages, especially in large scale integrated circuit design. One of the more important advantages is that the shift register, when orthogonally clocked, provides complete control of the sequence at all times by eliminating race conditions.

If the sequence being controlled is of the demand-response type and a limit is placed on the allowable time to wait for a given response, then a uniformly clocked shift register implementation cannot be used. It becomes necessary that the shift register be provided, in effect, with a variable number of stages which can be dynamically altered in accordance with the interval taken by each timely response.

SUMMARY OF THE INVENTION

A primary shift register and a secondary shift register which form the equivalent of a variable length composite shift register whose length is automatically equated to the total interval required to receive all timely responses over a demand-response interface.

The primary shift register is divided into successive portions selectively coupled to each other in contiguous pairs upon receipt of respective timely response signals. A binary "1" is clocked through to the end of each portion where it becomes stalled while a demand is made and the corresponding response is awaited. The shifting of the "1" into and through the next portion is resumed upon receipt of a timely response. The timeliness of each response signal is determined with the aid of a secondary shift register. The length of the secondary shift register corresponds to a predetermined maximum allowable elaspsed time between a demand and its respective response. A "1" is inserted into and clocked through the secondary shift register beginning the occurrence of each demand. The secondary shift register is reset upon the occurrence of each timely response (prior to the time that the "1" propagates to the end of the secondary shift register). In the absence of a timely response, the "1" porpagates to the end of the secondary shift register to produce a control signal which blocks the coupling between the successive portions of the primary shift register.

Figure 1:
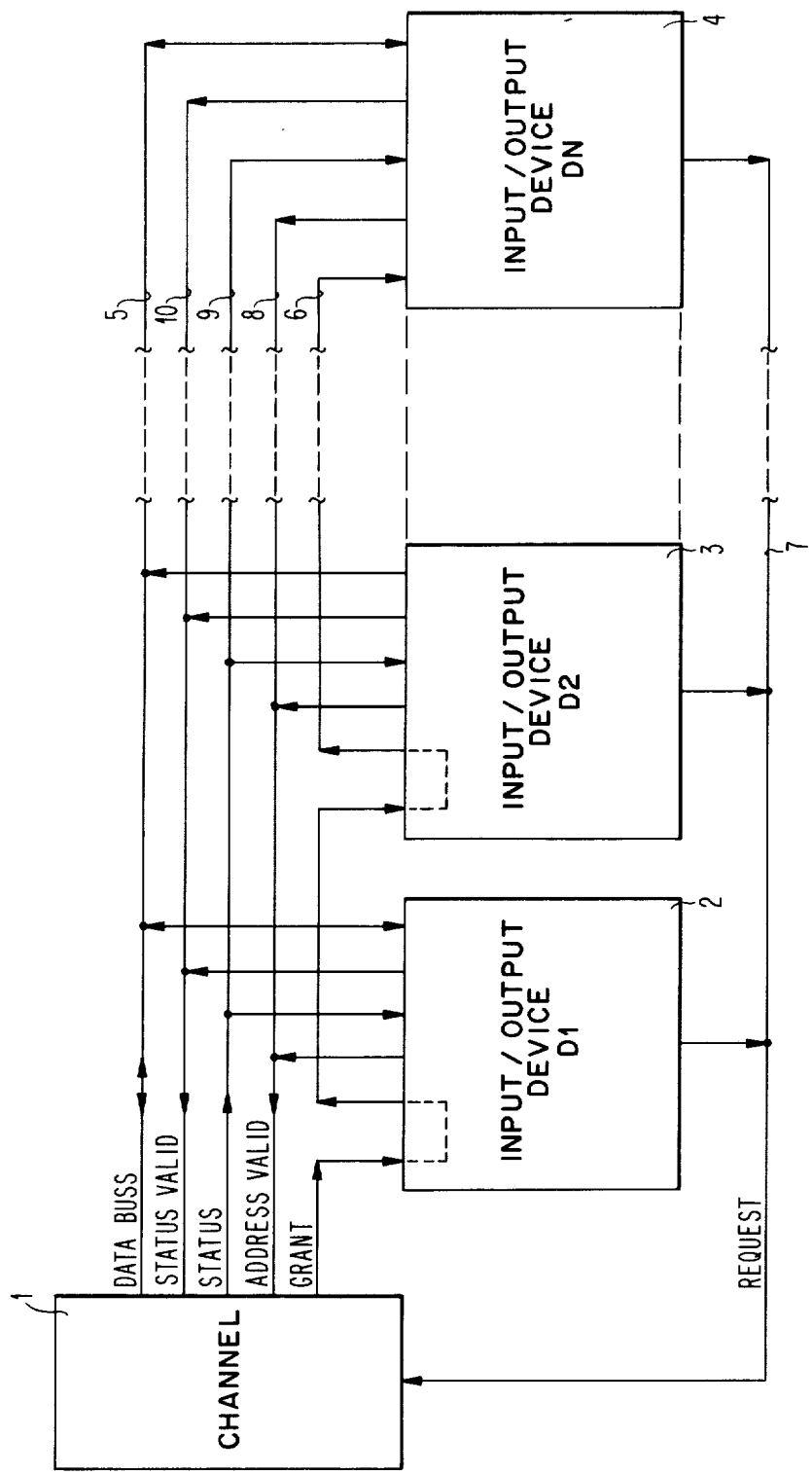
FIG. 1 is a simplified block diagram of a typical prior art demand-response interactive system in which the present invention may be used.

Typical demand-response interface sequencing of control lines in a data transmission system may be understood with the aid of FIG. 1. Computer channel 1 communicates with a plurality of input-output devices 2, 3 and 4 via a common set of data lines 5 and control lines 6–10. A predetermined sequence of events is initiated by one of the devices 2–4 which activates the "request" control line 7 to request service (read or write) from channel 1. The Grant control line 6 is activated by channel 1 in due course in response to the Request signal. The activated Grant line 6 passes through each device in a serial manner with each device determining whether it needs service before gating the Grant signal to the next device. This action, in effect, sets up a priority of service between devices 2, 3 and 4 and causes a delay in responding to the Grant signal depending upon which of the devices requires service.

When a device receives an active Grant signal and requires service, it will not gate the Grant signal to the next device but will respond by putting its own address on data buss 5 and activating an Address Valid signal on line 8. If the channel requires additional information about the calling device, the channel activates a Status signal on line 9. The calling device, in turn, then responds by activating a Status Valid signal on line 10 after placing a signal representing its status on the data buss 5. It should be noted that the Status signal on line 9 is received simultaneously by each of the devices 2, 3 and 4, unlike the Grant signal which is processed serially through said devices.

It will be seen from the preceeding background discussion that the responses from devices 2, 3 and 4 to the various signals issued by channel 1 normally are delayed by varying time intervals, for example, by the differing times needed to process signals simultaneously in parallel as compared to processing signals in serial sequence. Of course, there also is the possibility that no response will take place within a maximum normal interval which constitutes an "error" condition. It is the purpose of the present invention to continuously control the timing of a demand-response sequence of events, to monitor the timeliness of all responses, to allow the sequence to continue only if the last received response is timely, and to terminate the sequence otherwise. These actions are provided by a composite shift register timer comprising the primary shift register of FIG. 2 and the secondary shift register of FIG. 3.

Figure 2:
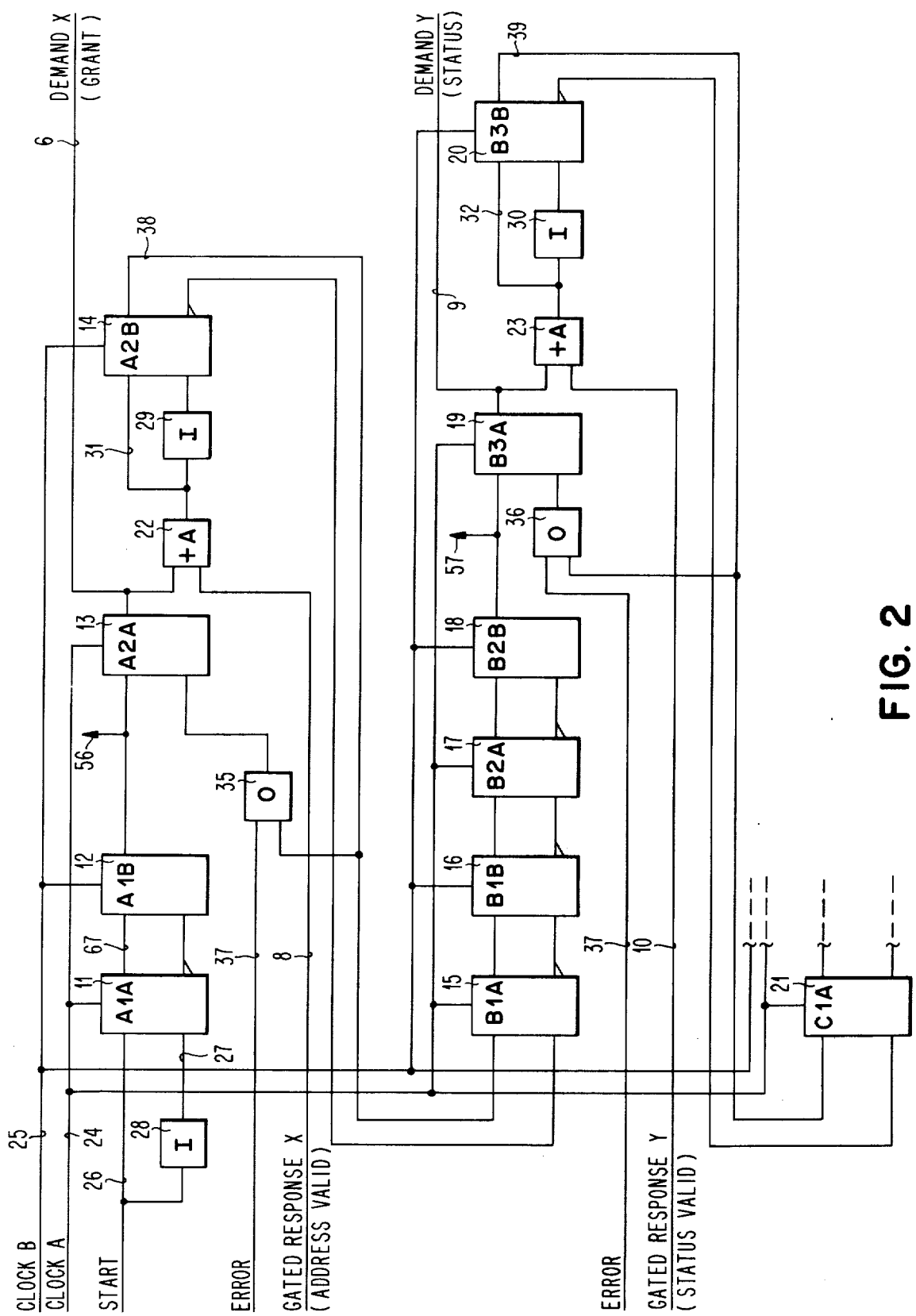
FIG. 2 is a simplified block diagram of the primary shift register of the present invention.

Referring to FIG. 2, the primary shift register comprises a series of conventional set-reset latches designated 11–21 which is divided into two or more portions by AND gates 22 and 23, respectively. The primary shift register may be lengthened, as required, by the addition of further portions (suggested by the dashed lines at the output of latch 21) and additional AND gates (not shown) corresponding to AND gates 22 and 23. The odd-numbered latches are clocked by the "A" clock pulses on line 24 and the even-numbered latches are clocked by the orthogonal "B" clock pulses on line 25. A given latch is set into a binary "1" condition upon the concurrence of the clock pulse and an activating signal on the upper input line such as line 26 and an inactive on line 27 of latch 11. The given latch is reset into a binary "0" condition upon the concurrence of a clock pulse and an activating signal on the lower input line such as line 27 and an inactive on line 26 of latch 11. Each latch receives its reset signal from its immediately preceeding latch except in the cases of latches 11, 14 and 20 which mark the beginning of respective portions of the primary shift register and latches 13 and 19 which mark the end of respective portions of the primary shift register.

The reset signals for latches 11, 14 and 20 are derived by respective inverters 28, 29 and 30 from the corresponding set signal lines 26, 31 and 32. Set signal line 26 is activated when the desired overall sequence of demand-response interaction is to be initiated. Set signal lines 31 and 32 are activated upon the conduction of respective AND gates 22 and 23, respectively. Each of AND gates 22 and 23 is rendered conductive when its preceeding latch is in state "1" and a gated response signal is present on respective lines 8 and 10. The reset signals for latches 13 and 19 are obtained at the outputs of respective OR circuits 35 and 36 which conduct upon the occurrence of either an "error" signal on line 37 or upon the occurrence of an activation signal on lines 38 and 39, respectively. As will be discussed later, the operation of the primary shift register of FIG. 2 is terminated upon the occurrence of an "error" signal on line 37 which resets all of the final latches (such as latches 13 and 19) of each portion of the primary shift register thereby precluding the propagation of the binary "1" to the first latch of the next succeeding portion (such as latches 14 and 20).

Figure 3:
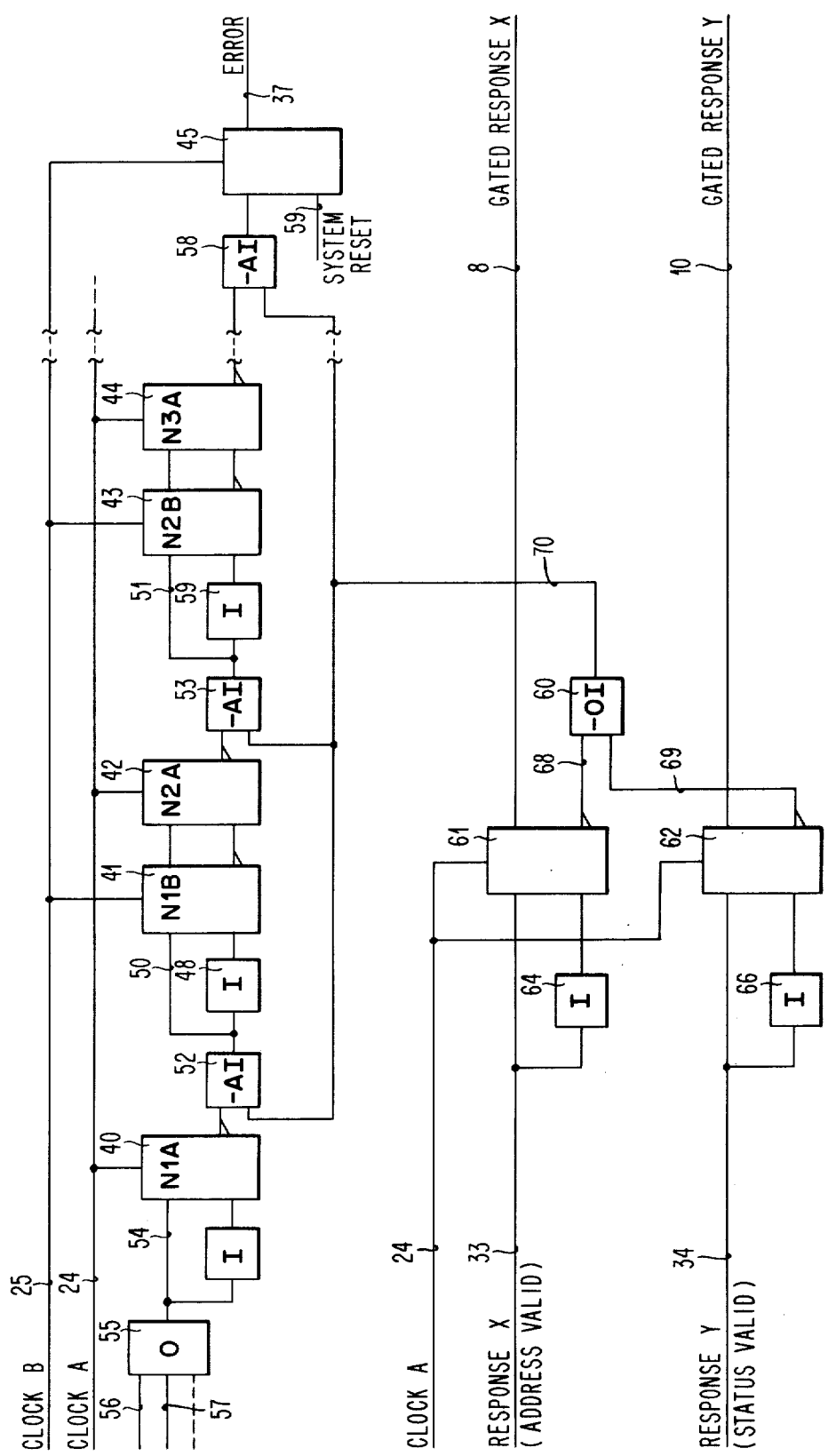
FIG. 3 is a simplified block diagram of the secondary shift register of the present invention.

The secondary shift register represented by FIG. 3 is similar to the primary shift register of FIG. 1 in that both comprise a series of set-reset latches through which a binary "1" is clocked. The propagation of the binary "1", however, is terminated in the secondary shift register and the secondary shift register is reset upon receipt of each timely response in a manner to be discussed. The secondary shift register of FIG. 3 produces the "error" signal which terminates the operation of the primary shift register of FIG. 2 in the absence of any timely response.

Referring to FIG. 3, the secondary shift register comprises the series of set-reset latches designated 40–44 and error signal generating latch 45. The even numbered latches are clocked by the "A" clock pulses on line 24. The odd-numbered latches are clocked by the "B" clock pulses on line 25. The reset signals for latches 41 and 43 are derived by inverters 48 and 49 from the set signals on lines 50 and 51, respectively. Said set signals, in turn, are produced by respective AND inverter circuits 52 and 53. The set and reset signals for latch 40 are similarly derived except that the set signal on line 54 is provided by the output of OR circuit 55. OR circuit 55 receives its inputs from the set signals applied to the final latches of each portion of the primary shift register of FIG. 2. Said set signals are available on lines such as lines 56 and 57 of FIGS. 2 and 3.

Latch 45 of FIG. 3 receives its set signal from the output of AND inverter circuit 58 and a reset signal from system reset line 59. AND inverter circuits 52, 53 and 58 are connected to the reset output of a respectively preceeding latch and also to the output of OR inverter circuit 60. Circuit 60, in turn, is connected to the reset outputs of latches 61 and 62 which are clocked by the "A" clock pulses on line 24. A first response on line 33 sets latch 61. The reset signal for latch 61 is derived by inverter 64 from the signal on line 33. A second response signal on line 34 sets latch 62. The reset signal for latch 62 is derived by inverter 66 from the signal on line 34.

The operation of the primary and secondary shift registers of FIGS. 2 and 3, respectively, will be described with the aid of the timing diagram of FIG. 4. One of the input-output devices generates a Request signal (on line 7 of FIG. 1) indicating that it requires service from channel 1 of FIG. 1. The request signal persists until the channel becomes free to accept it, whereupon a Start pulse is generated by the channel and applied to line 26 of FIG. 2. The Start pulse initiates a predetermined sequence of events by entering a single "1" bit into latch 11 upon the occurrence of the next following A clock pulse. This action activates the set output line 67 for the duration represented by the length of the line captioned "A1A" of FIG. 4. The activation of line 67 places a binary "1" into latch 12 upon the occurrence of the next following B clock pulse. The resulting activation of the set output line 56 persists for the duration represented by the line "A1B" of FIG. 4. The activation of line 56 sets a binary "1" into latch 13 (upon the occurrence of the next following A clock pulse) and passes through OR circuit 55 of FIG. 3 to activate line 54 placing a binary "1" into latch 40 (upon the occurrence of the same A clock pulse that sets latch 13 of FIG. 2). The settings of latches 13 and 40 continue for durations represented by the lengths of lines "A2A" and "N1A", respectively, of FIG. 4. Latch 13, when set, produces a Grant signal on line 6.

The binary "1" placed into latch 40 is clocked in a regular manner through the succeeding latches 41, 42, etc., until the response (designated "Address Valid") is received corresponding to the "Grant" issued by the channel. Prior to receipt of the Address Valid response, latches 61 and 62 of FIG. 3 remain reset whereby the reset output lines 68 and 69 are both activated. OR inverter circuit 60 provides a "zero" output signal on line 70 which unblocks each of the AND inverter circuits 52, 53 and 58 to allow the passage of any binary "1" which is set into latches 40, 42 or the latch (not shown) immediately preceding AND inverter circuit 58. Thus, the binary "1" propagates freely through the secondary shift register of FIG. 3 until either latch 61 or latch 62 is set by a respectively received "Response" signal. Upon receipt of the Address Valid response signal, line 33 of FIG. 3 is activated, placing a binary "1" into latch 61 (upon the occurrence of the next following A clock pulse) and simultaneously blocking each of the and inverter circuits within the secondary shift register. In the specific example shown in FIG. 4, the Gated Address Valid signal is generated at the same time as the setting of latch 42 whereby gate 53 is blocked before latch 43 can be set.

In the event that the Address Valid signal is timely received (which is the case depicted in FIG. 4), the binary "1" has not yet traveled to the error signal generating latch 45 so that no Error is produced on line 37. The setting of latch 61 causes the activation of line 8 and causes the conduction of AND gate 22 of FIG. 2 which has been receiving an activated set output on line 6 from latch 13. Line 31 at the output of AND gate 22 accordingly is activated, placing a binary "1" into latch 14 upon the occurrence of the next following B clock pulse. The setting of latch 14 continues for a period of time represented by the line "A2B" of FIG. 4.

In summary, a binary "1" is placed into the first latch of the primary shift register of FIG. 2 in response to a request for service by one of the IO devices. That binary "1" propagates through the primary shift register until it reaches the position of latch 13 which holds the binary "1" and simultaneously places a binary "1" 1 into the first latch of the secondary shift register. The binary "1" propagates through the latches of the secondary shift register until a response (address valid) is received. If the address valid is timely received, the binary "1" is cancelled out in the secondary shift register and is permitted to continue to propagate through the latches of the primary shift register. If the address valid signal is not timely received or not received at all, the binary "1" reaches the error generating latch 45 of the secondary shift register preventing the further operation of the primary shift register. The last named action is achieved by the error signal on line 37 which passes through OR circuit 35 to reset latch 13 (and thus eliminate the binary "1".

Figure 4:
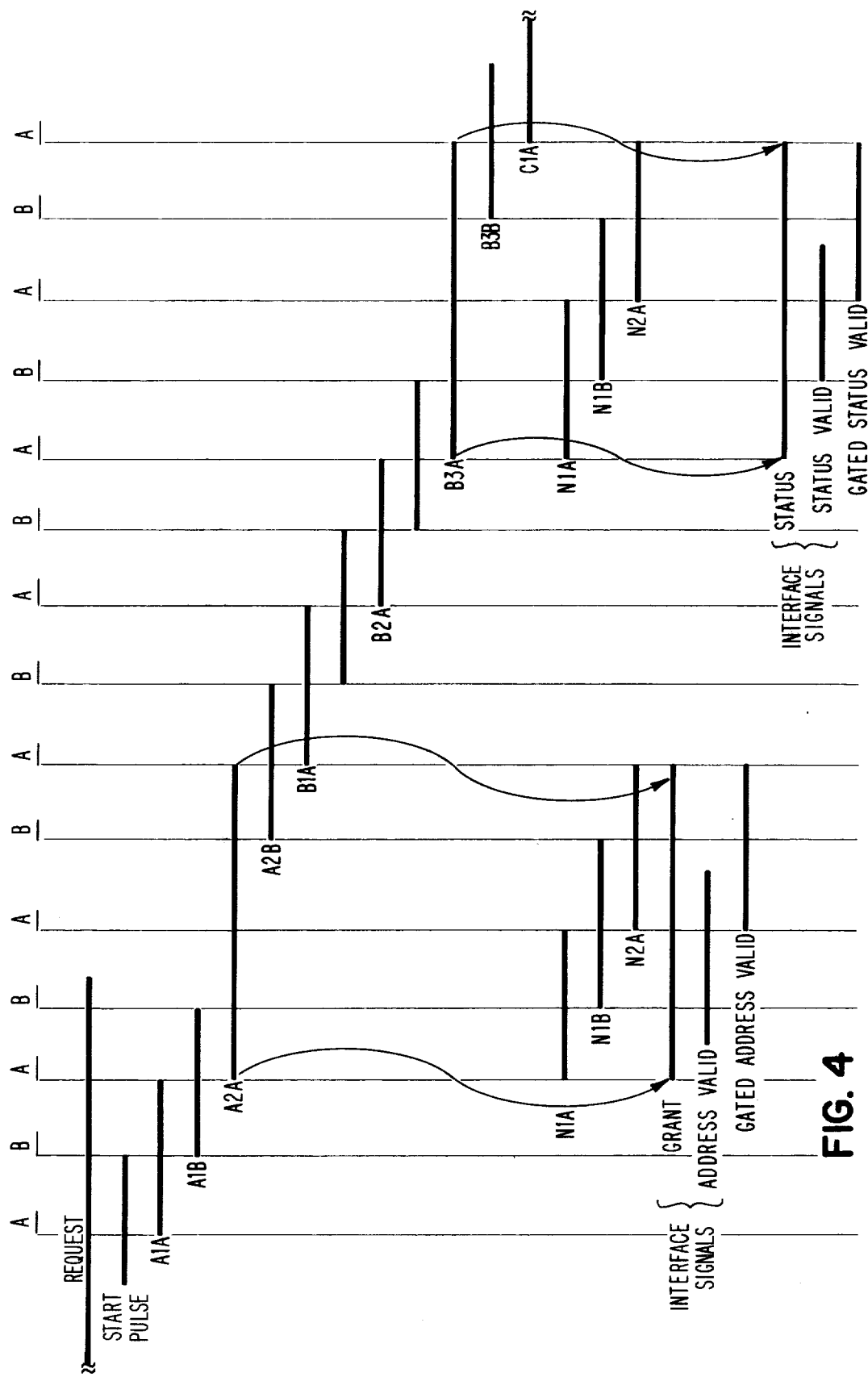
FIG. 4 is a timing diagram of the operation of the shift registers of FIGS. 1 and 2.

Subsequent operation of the primary and secondary shift registers will be obvious to those skilled in the art with the aid of the timing diagram of FIG. 4 in the light of the preceding discussion. Briefly, after a timely address valid signal is received, the binary "1" continues its interrupted propagation through latches 14, 15, 16, 17 and 18 and sets latch 19 of FIG. 2. The setting of latch 18 activates line 57 which causes a binary "1" to be reinserted into the first latch 40 of the secondary shift register. Latch 19 is set for a duration represented by the line "B3A" of FIG. 4. The setting of latch 19 produces a Status signal on line 9 which is received by the input-output device now in communication with the channel. A Status Valid signal is generated in due course by the I/O device in response to the status signal. The status valid signal is received in timely fashion in the example of FIG. 4. Further interactions between the channel and the responding input-output device may be provided for as represented by the additional latch 21 of the primary shift register of FIG. 2.

While the invention has been particularly shown and described with reference to the preferred embodiments thereof, it will be understood by those skilled in the art that various changes in form and details may be made therein without departing from the spirit and scope of the invention.

What is claimed is:

1. A composite shift register timer comprising:
   a primary shift register,
   a secondary shift register,
   a source of first signals,
   said primary shift register being coupled to receive said first signals and being divided into portions consisting of respective numbers of shift register elements,
   said portions being selectively coupled together in successive pairs upon timely receipt of respective ones of said first signals,
   the coupling together of said primary shift register portions being blocked upon receipt of a second signal,
   means for inserting a first binary "1" into the input of the first portion of said primary shift register,
   first means for clocking said first binary "1" through each said portion and between successive portions which are selectively coupled together,
   said primary shift register producing a third signal each time said first binary "1" approaches the end of any portion of said primary shift register,
   each said third signal being applied to said secondary shift register,
   means for inserting a second binary "1" into the input of said secondary shift register in response to each said third signal, and
   second means for clocking said second binary "1" through said secondary shift register,
   said secondary shift register being coupled to receive said first signal and being reset upon the occurrence of each said first signal,
   said secondary shift register producing said second signal each time said second binary "1" reaches the end of said secondary shift register,
   said second signal being applied to said primary shift register.

2. Apparatus as defined in claim 1 wherein each said first signal is delayed with respect to a respective one of said third signals.

3. Apparatus as defined in claim 1 wherein at least one of said first signals is delayed an uncertain amount with respect to the respective third signal.

4. Apparatus as defined in claim 2 wherein each said first signal occurs in response to a respective one of said third signals.

5. Apparatus as defined in claim 3 wherein each said first signal occurs in response to a respective one of said third signals.

6. Apparatus as defined in claim 1 and further including a respective AND gate for selectively coupling each said successive pair together,
   each said AND gate being conditioned for conduction when its immediately preceding shift register element is in a set condition,
   said immediately preceding shift register element being placed into a reset condition upon the occurrence of a respective second signal.

7. Apparatus as defined in claim 6 wherein said first signals are applied to respective ones of said AND gates, said first signals conditioning said AND gates for conduction.

8. Apparatus as defined in claim 6 wherein said first and second means for clocking comprise orthogonal pulse clocking means.

* * * * *